United States Patent
Mason et al.

(10) Patent No.: US 12,263,826 B1
(45) Date of Patent: Apr. 1, 2025

(54) SERIES HYBRID ENGINE CONTROL WITH DRIVERPOWER FOLLOWING

(71) Applicant: FCA US LLC, Auburn Hills, MI (US)

(72) Inventors: Barry A Mason, Bradford (CA); Christopher A Tuckfield, Bloomfield Hills, MI (US); Drushan Mavalankar, Rochester Hills, MI (US); Chunjian Wang, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/677,068

(22) Filed: May 29, 2024

(51) Int. Cl.
*B60W 10/06* (2006.01)

(52) U.S. Cl.
CPC ......... *B60W 10/06* (2013.01); *B60W 2520/10* (2013.01); *B60W 2710/0666* (2013.01)

(58) Field of Classification Search
CPC ............. B60W 10/06; B60W 2520/10; B60W 2710/0666; B60W 2710/0644; B60W 2710/0677; B60W 20/00
See application file for complete search history.

(56) References Cited

U.S. PATENT DOCUMENTS

| | | | |
|---|---|---|---|
| 2009/0209381 A1* | 8/2009 | Ai | B60K 6/26 475/5 |
| 2010/0063704 A1* | 3/2010 | Okubo | B60K 6/365 701/99 |
| 2012/0059565 A1* | 3/2012 | Kozarekar | B60W 10/08 701/99 |
| 2015/0224864 A1* | 8/2015 | Schwartz | B60K 6/28 180/65.245 |
| 2016/0368482 A1* | 12/2016 | Shahverdi | B60W 20/13 |

* cited by examiner

Primary Examiner — Edwin A Young
(74) Attorney, Agent, or Firm — Jeremy J. Klobucar

(57) ABSTRACT

A control system that controls speed of an internal combustion engine (ICE) in a series hybrid vehicle includes an accelerator pedal, a vehicle speed sensor and a controller. The accelerator pedal sends a torque request signal. The vehicle speed sensor sends a vehicle speed signal. The controller receives the torque request signal and the vehicle speed signal. The controller is configured to calculate, based on the torque request and vehicle speed signals, a driver power request; calculate engine power limits including (i) a maximum engine power that includes the driver power request plus an upper offset; and (ii) a minimum engine power that includes the driver power request minus a lower offset; select a most efficient engine operating point between the maximum and minimum power; and control the ICE to operate at the most efficient engine operating point.

18 Claims, 6 Drawing Sheets

SERIES HYBRID ENGINE CONTROL WITH DRIVERPOWER FOLLOWING

FIELD

The present application generally relates to plug-in hybrid vehicles and, more particularly, to a control system and method for controlling engine speed in a series hybrid vehicle in a charge sustaining mode based on a driver power request.

BACKGROUND

A series hybrid vehicle includes at least one drive motor used to propel the vehicle. The drive motor(s) are coupled to a high voltage battery system and generator through a common high voltage architecture. The generator converts mechanical power from an internal combustion engine (ICE) into electrical power to charge the high voltage battery or power the drive motor(s). Unlike in a parallel hybrid vehicle with a mechanical fixed gear transmission, in a series hybrid vehicle, the engine speed can be operated independently from the vehicle speed by the generator. This can result in the ICE operating at a single constant speed and load or a select few constant speed and load points that are most efficient for a given driver power request. This can lead to noise vibration and harshness (NVH) concerns when the resulting engine power is significantly higher than the driver power request. Accordingly, while such series hybrid vehicles work for their intended purpose, there is a desire for improvement in the relevant art.

SUMMARY

According to one example aspect of the invention, a control system that controls speed of an internal combustion engine (ICE) in a series hybrid vehicle includes an accelerator pedal, a vehicle speed sensor and a controller. The accelerator pedal sends a torque request signal. The vehicle speed sensor sends a vehicle speed signal. The controller receives the torque request signal and the vehicle speed signal. The controller is configured to calculate, based on the torque request and vehicle speed signals, a driver power request; calculate engine power limits including (i) a maximum engine power that includes the driver power request plus an upper offset; and (ii) a minimum engine power that includes the driver power request minus a lower offset; select a most efficient engine operating point between the maximum and minimum power; and control the ICE to operate at the most efficient engine operating point.

In some implementations, the most efficient engine operating point comprises an engine speed and an engine torque.

In some implementations, the upper offset is 20% higher than the driver power request. In some examples, the upper and lower offsets can be a percent of the driver power request or a constant power difference of the driver power request (such as, for example, 20 kW power).

In some implementations, the upper offset is 15% higher than the driver power request.

In some implementations, the upper offset is 10% higher than the driver power request.

In some implementations, the lower offset is 5% lower than the driver power request.

In other implementations, the controller is configured to calculate the driver power request based on a determination that the ICE is on.

In some implementations, the controller is configured to operate the ICE at a corresponding engine speed proportional to the vehicle speed signal.

In additional aspects, a generator converts mechanical power from the ICE into electrical power to one of charge a high voltage battery and power the at least one electric drive motor.

According to one example aspect of the invention, a method for controlling a speed of an internal combustion engine (ICE) in a series hybrid vehicle is provided. The method includes: receiving, at a controller, a torque request signal and a vehicle speed signal; calculating, based on the torque request and vehicle speed signals, a driver power request; calculating engine power limits including (i) a maximum engine power that includes the driver power request plus an upper offset; and (ii) a minimum engine power that includes the driver power request minus a lower offset; selecting a most efficient engine operating point between the maximum and minimum power; and controlling the ICE to operate at the most efficient engine operating point.

In some implementations, the most efficient engine operating point comprises an engine speed and an engine torque.

In some implementations, the upper offset is 20% higher than the driver power request.

In some implementations, the upper offset is 15% higher than the driver power request.

In some implementations, the upper offset is 10% higher than the driver power request.

In some implementations, the lower offset is 5% lower than the driver power request.

In other implementations, the method further includes: calculating the driver power request based on a determination that the ICE is on.

In some implementations, the method further includes: operating the ICE at a corresponding engine speed proportional to the vehicle speed signal.

In additional aspects, a generator converts mechanical power from the ICE into electrical power to one of charge a high voltage battery and power the at least one electric drive motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As mentioned above, in a series hybrid vehicle, the engine speed and load can be operated independently from the vehicle speed by the generator. When a series hybrid vehicle is operating in a charge sustaining mode, the ICE speed and load can operate independently from the vehicle speed and driver power request. This can result in the ICE operating at a single constant speed and load or a select few constant speed and load points that are most efficient for a given driver power request. This can lead to noise vibration and harshness (NVH) concerns when the resulting engine power is significantly higher than the driver power request. Such NVH is most noticeable during low vehicle speed driving where there is less road noise to mask the engine noise. A disconnect sensation can be experienced by the driver between engine sound, driver power request and vehicle speed.

The instant disclosure provides a vehicle control system and control strategy for controlling engine speed in a series hybrid vehicle based on a driver power request in a charge sustaining mode. As will be described in detail herein, the power the engine can operate at is limited to a calibratable power offset from the current driver power request. This eliminates the possibility for the engine power to operate significantly higher than the driver power request thereby improving vehicle NVH, particularly at low speeds. It also results in the driver perception that the engine speed and resulting noise is connected to the vehicle speed, which is the expected behavior of past drivers of parallel hybrid and conventional powertrain vehicles.

Figure 1:
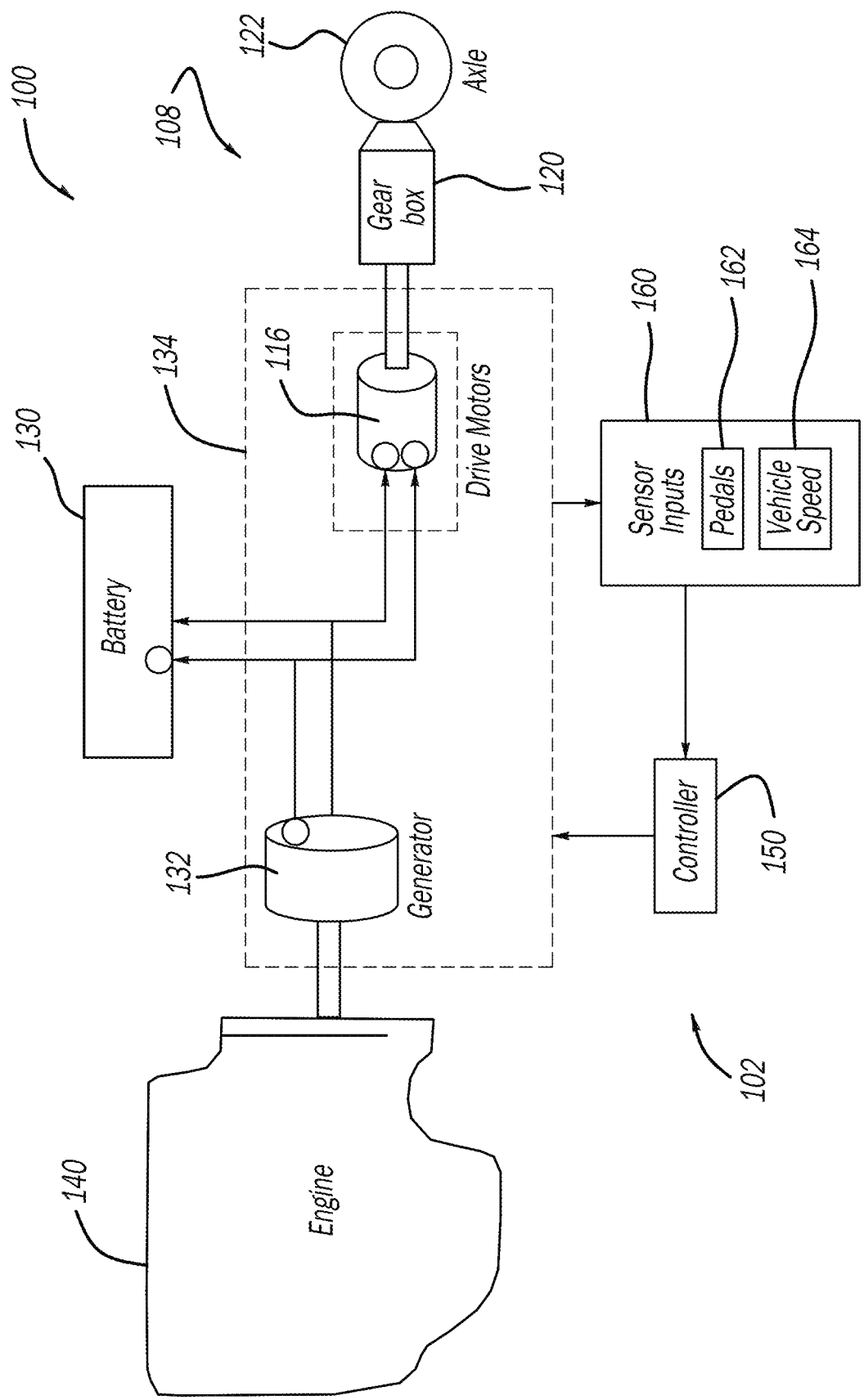
FIG. 1 is a functional block diagram of a series hybrid electric vehicle that implements a control strategy for controlling engine speed according to various principles of the present application.

Referring now to FIG. 1, a functional block diagram of an example series hybrid vehicle 100 (also referred to herein as "vehicle 100") that incorporates a vehicle control system 102 for controlling engine speed according to the principles of the present application is illustrated. The vehicle 100 includes an electrified powertrain 134 having one or more electric drive units or motors 116 (e.g., electric traction motors) configured to generate and transfer drive torque to a driveline 108 for vehicle propulsion. The driveline 108 can include a gearbox 120 and a drive axle 122 that drives drive wheels 124.

The drive motors 116 are used to propel the vehicle 100. The drive motors 116 are coupled to a high voltage battery 130 and a generator 132 through a common high voltage architecture 134. The generator 132 converts mechanical power from an internal combustion engine (ICE) 140 into electrical power to charge the high voltage battery 130 or power the drive motors 116. As identified above, in a series hybrid vehicle (unlike in a parallel hybrid vehicle with a mechanical fixed gear transmission), the engine speed and load can be operated independently from the vehicle speed by the generator 132. In a series hybrid, the ICE 140 does not have a mechanical path to the drive wheels 124. Instead, the only path to produce power at the drive wheels 124 is through the generator 132 to produce electrical power. The electrical power from the generator 132 flows to the battery 130 for charging, and/or to the drive motors 116 for powering the vehicle drive wheels 124.

The vehicle control system 102 includes a controller 150 that receives signals from sensor inputs 160 such as a drive input device, e.g., an accelerator pedal 162, for providing a driver input, e.g., a torque request, to the controller 150 and ultimately to the high voltage architecture 134 and ICE 140. The sensor inputs 160 can also include a vehicle speed sensor 164 that provides a vehicle speed. While the vehicle control system 102 is shown as a single controller 150, it will be appreciated that more controllers and/or modules, such as a supervisory electric vehicle control module, a battery control module, a motor control module and a chassis stability module, can be utilized to control various vehicle components of the series hybrid vehicle 100. In this regard, various controllers and modules are configured to communicate with each other, utilizing different sensor inputs 160 and calculated parameters for controlling operation of the vehicle control system 102.

Figure 2:
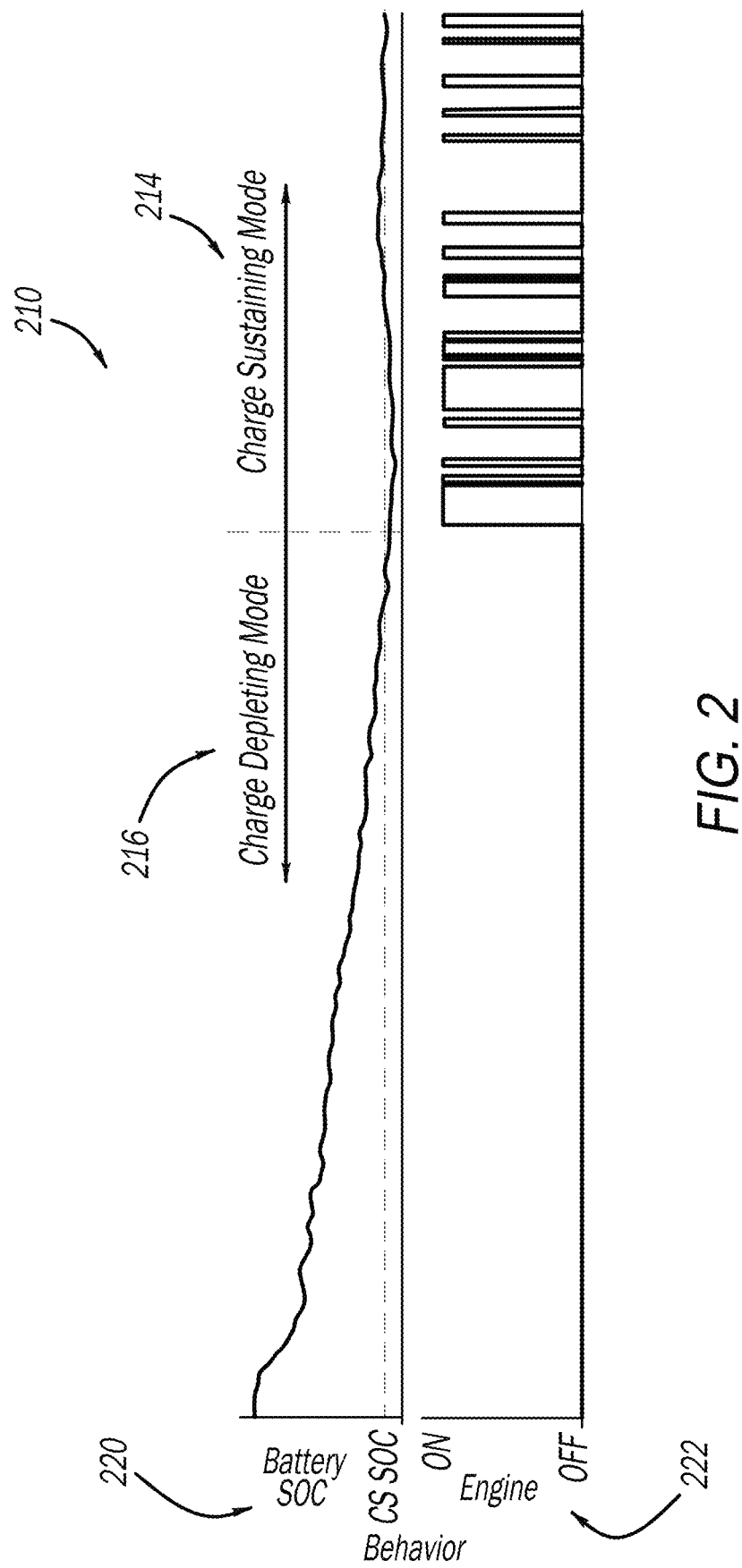
FIG. 2 is a plot illustrating charge sustaining and charge depleting modes showing battery state of charge and engine behavior according to example series hybrid powertrains.

With additional reference now to FIG. 2, a plot 210 illustrating a charge sustaining 214 and a charge depleting mode 216 is shown. A battery state of charge 220 and engine behavior 222 according to example series hybrid powertrains are illustrated. As is known, plug-in hybrid vehicles can operate in a charge depleting mode 216 and a charge sustaining mode 214. In a charge depleting mode 216, the energy from the battery 130 is used primarily (or exclusively) to propel the vehicle 100 such that the battery state of charge decreases. In the charge sustaining mode 214, the fuel energy is used primarily to propel the vehicle 100 so that the battery energy remains approximately constant such that the battery state of charge is maintained. As shown, the ICE 140 starts when energy has been depleted from the battery 130. Furthermore, the ICE 140 runs at optimal times to minimize fuel consumption while maintaining state of charge in a narrow range.

Figure 3:
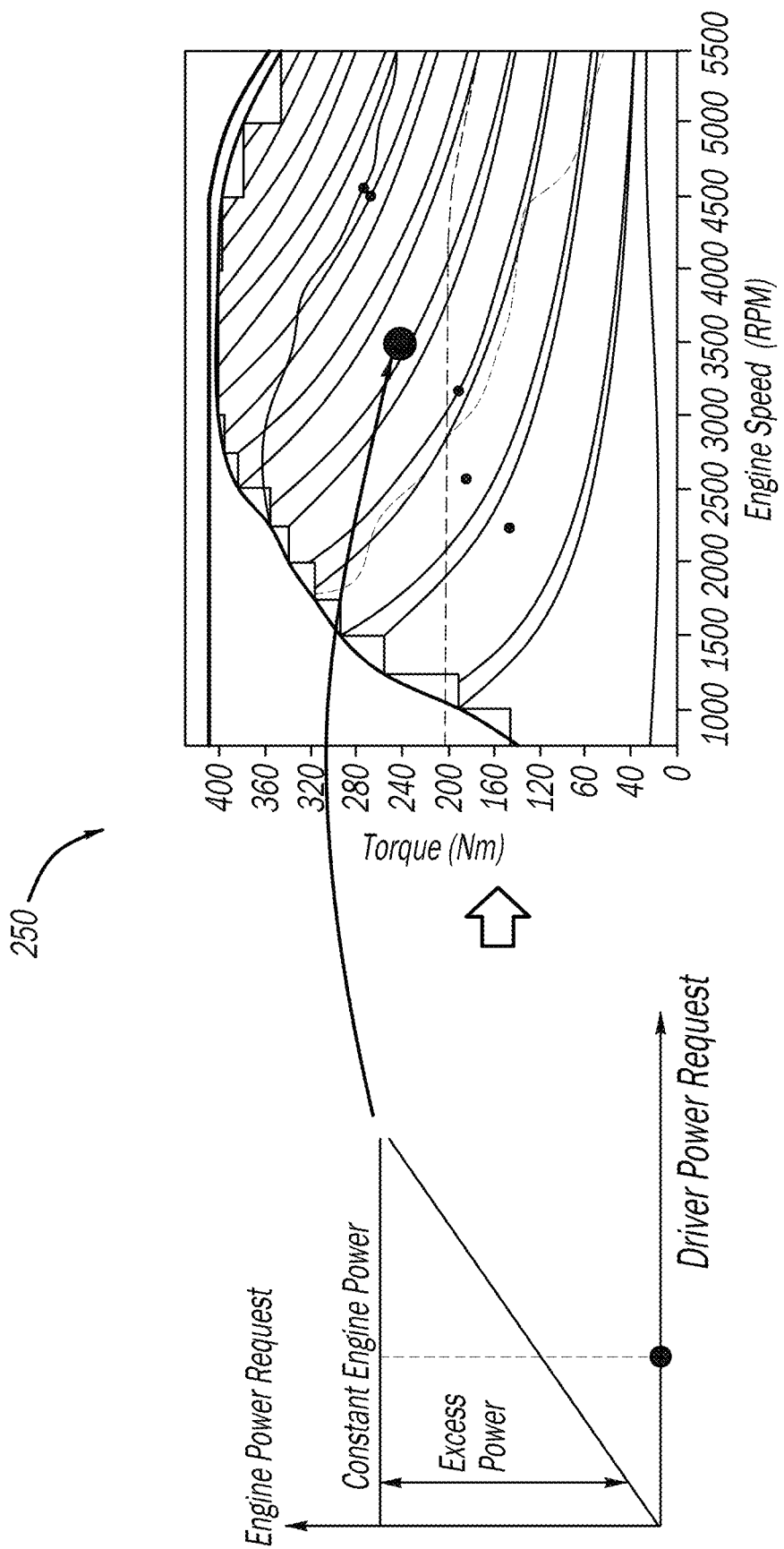
FIG. 3 is a plot illustrating unconstrained series hybrid engine control that results in an engine operating at a constant engine power (constant speed and load) or a select few constant speed and load points that are most efficient for a given driver power request.

Turning now to FIG. 3, a plot 250 illustrating unconstrained series hybrid engine control according to prior art examples that results in an engine operating at a constant engine power (constant speed and load) or a select few constant speed and load points that are most efficient for a given driver power request. Such a strategy can result in the engine producing significantly higher power than the driver power request. As can be appreciated, in some operating conditions, such as driving in a subdivision or other area at low speeds, the engine can be commanded to produce significantly higher power than the driver power request. The condition is undesirable as the sound emanating from the ICE can suggest an unreasonably elevated power output for the given situation. The vehicle control system 102 commands a more appropriate engine power (RPM), and thereby perceived engine sound output for a given situation.

Figure 4:
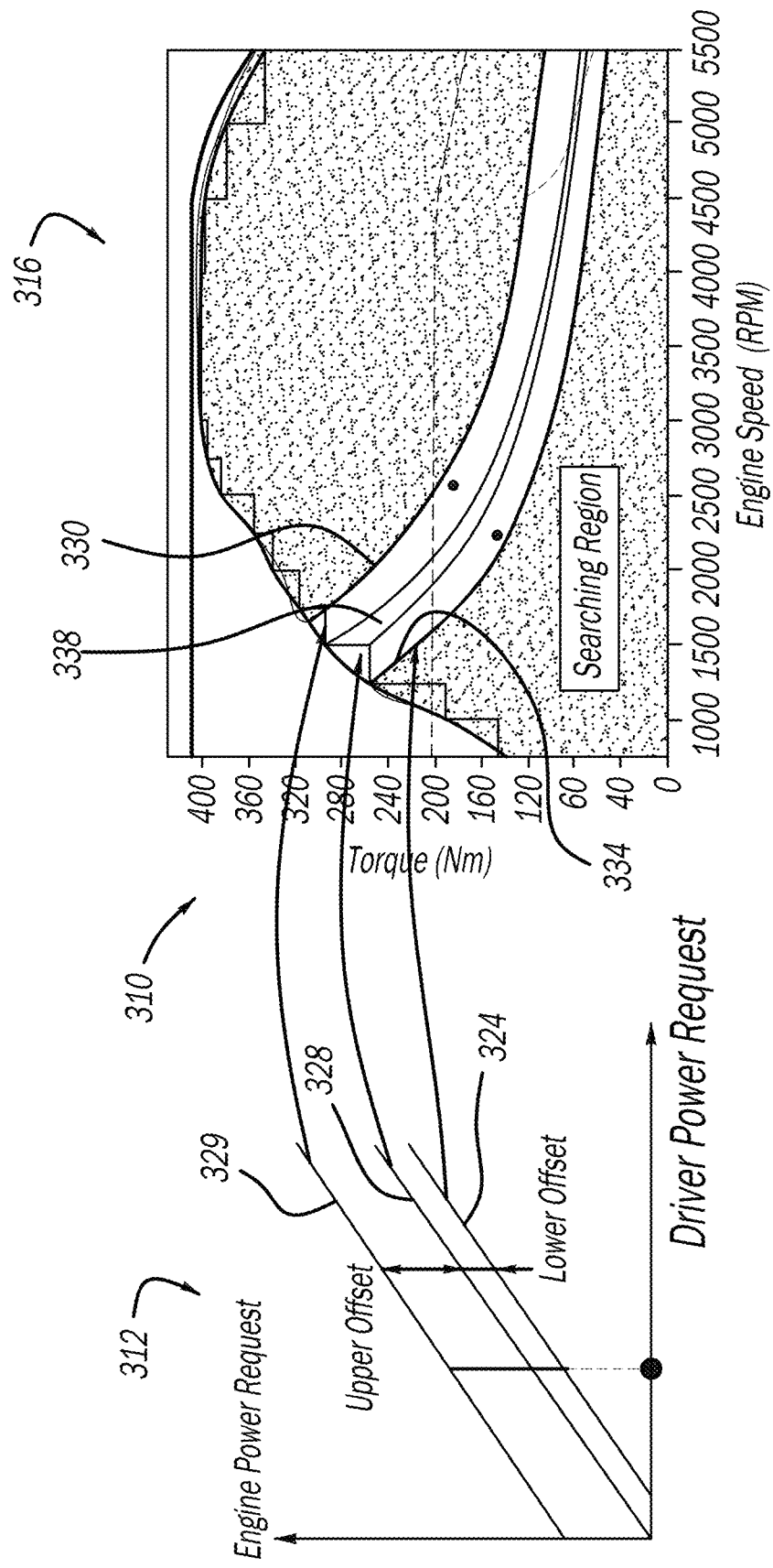
FIG. 4 is a plot illustrating a series hybrid engine control based on driver power request according to examples of the present disclosure.

FIG. 4 is a plot 310 illustrating a series hybrid engine control using driver power request according to examples of the present disclosure. The control system 102 limits the engine power to a calibratable power offset from the current driver power request, which results in the perception that the ICE 140 power is proportional to the driver power request. When the series hybrid is operating in a charge sustaining mode, the engine speed and load can operate only within a certain range 312 of engine power.

The ranges of power 312 include an upper offset defined by the range between 329 and 328, and a lower offset defined by the range between 324 and 328. The engine speed and torque is mapped at 330, 334 and 338 on map 316. The control system 102 results in the engine 140 operating at an engine power proportional to the driver power request, which results in the engine speed and load varying to operate at the most efficient point for the current engine power. The engine power limit can be a range that is calibrated to have an upper and lower offset from the current driver power request. The control strategy eliminates the engine 140 producing significantly higher power than the driver power request. In this regard, the possibility for the engine power to operate at significantly higher power than the driver power request is eliminated, improving vehicle NVH, particularly at low vehicle speeds.

The control system 102 is an improvement over prior art configurations because the operation of the ICE 140 is limited to a calibratable offset from the current driver power request. In a series hybrid vehicle with a real-time fuel consumption optimizer present, the results in the engine 140 operating at the most efficient point for the current driver power request. Previous solutions for engine control in series hybrid vehicles have been designed to operate at select constant speed and load points for a given driver power request, vehicle speed and battery state of charge.

Figure 5:
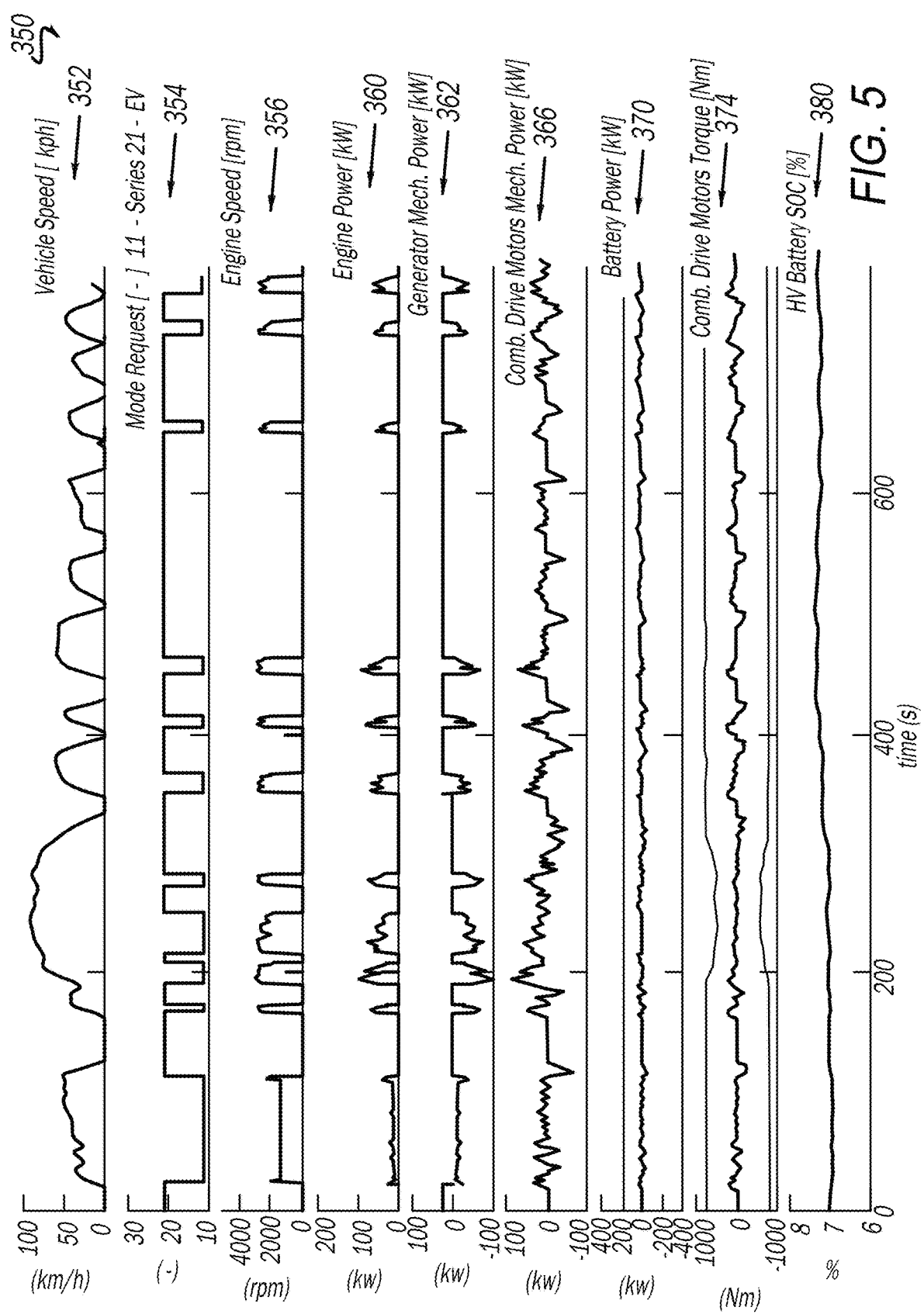
FIG. 5 is a series of plots showing various parameters over time of the series hybrid engine control using driver power request of FIG. 4 according to examples of the present disclosure.

FIG. 5 is a series of plots 350 showing various parameters over time of the series hybrid engine control using the driver power request of FIG. 4. The series of plots 350 includes a vehicle speed 352, a mode request 354, an engine speed 356, an engine power 360, a generator mechanical power 362. A combined drive motors mechanical power 366, a batter power 370, a combined drive motors torque 374 and a high voltage battery state of charge 380. It will be appreciated that the respective values of the plots 350 may be different within the scope of the present disclosure.

Figure 6:
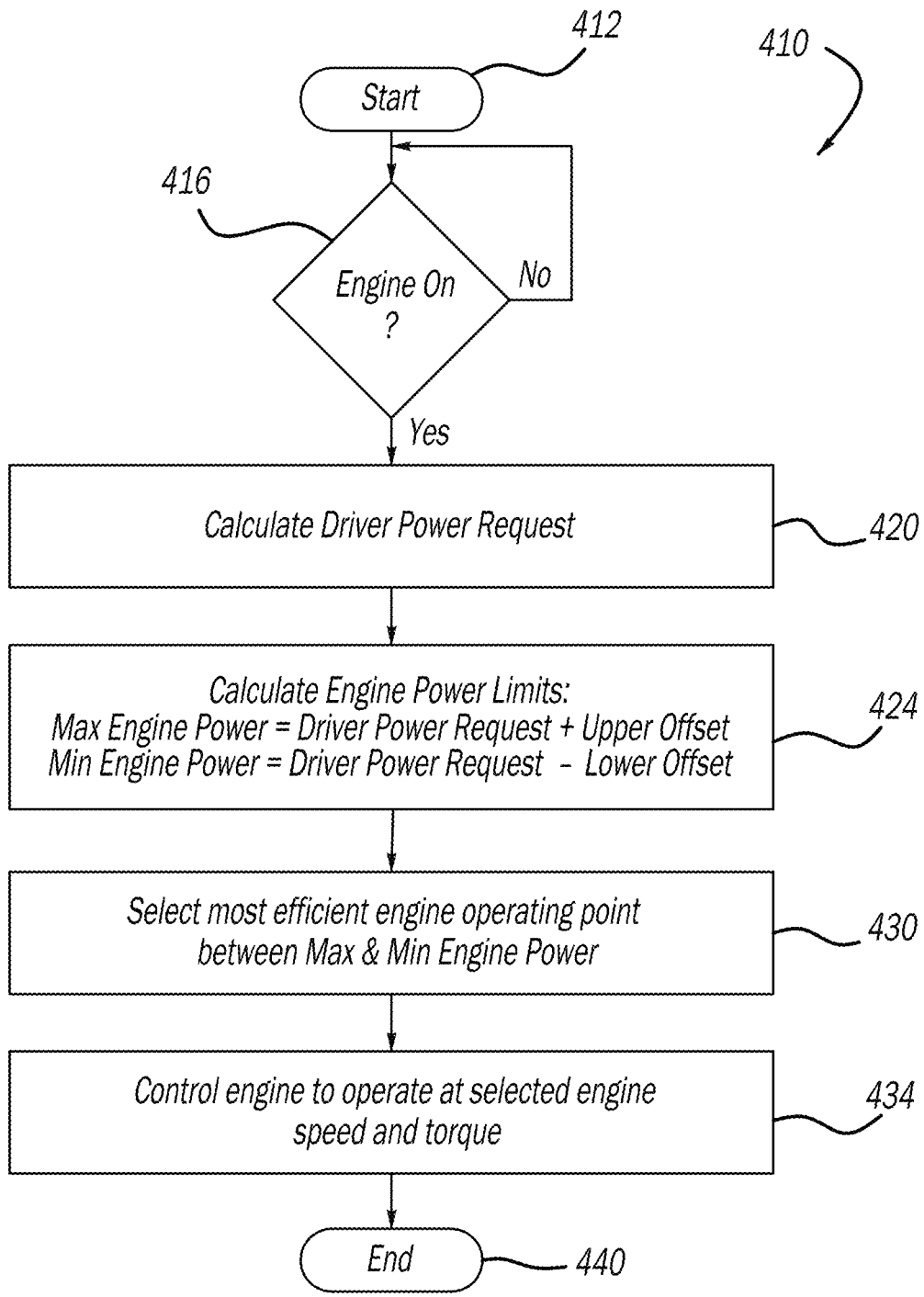
FIG. 6 is a logic flow diagram illustrating a method of controlling the series hybrid engine using driver power request according to examples of the present disclosure.

Turning now to FIG. 6, a method 410 of controlling the series hybrid engine using driver power following according to examples of the present disclosure will be described. The method 410 starts at 412. At 416, control determines whether the engine 140 is on. If the engine 140 is not on, control loops to 416. If control determines that the engine 140 is on, control calculates a driver power request at 420. At 424, control calculates engine power limits. As identified above at FIG. 4, the engine power limit can be a range that is calibrated to have an upper and lower offset from the current driver power request. The engine power limits include a maximum engine power that equals a driver power request plus an upper offset. In examples, the upper offset can be any suitable calibrated offset such as, but not limited to, 20%, 15% or 10% higher than the driver power request, or 20, 15, 10 kW higher than the driver power request. A minimum engine power equals a driver power request minus a lower offset. In examples, the lower offset can be any suitable calibrated offset such as, but not limited to, 5% lower than the driver power request or 10 kW lower than the driver power request. At 430, control selects a most efficient engine operating point between the maximum engine power and the minimum engine power. At 434 control operates the engine at the selected engine speed and torque.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A control system that controls speed of an internal combustion engine (ICE) in a series hybrid vehicle, the control system comprising:
   an accelerator pedal that sends a torque request signal;
   a vehicle speed sensor that sends a vehicle speed signal; and
   a controller that receives the torque request signal and the vehicle speed signal and that is configured to:
      calculate, based on the torque request and vehicle speed signals, a driver power request;
      calculate engine power limits including (i) a maximum engine power that includes the driver power request plus an upper offset; and (ii) a minimum engine power that includes the driver power request minus a lower offset;
      select a most efficient engine operating point between the maximum and minimum engine power; and
      control the ICE to operate at the most efficient engine operating point.

2. The control system of claim 1, wherein the most efficient engine operating point comprises an engine speed and an engine torque.

3. The control system of claim 1, wherein the upper offset is 20% higher than the driver power request.

4. The control system of claim 1, wherein the upper offset is 15% higher than the driver power request.

5. The control system of claim 1, wherein the upper offset is 10% higher than the driver power request.

6. The control system of claim 1, wherein the lower offset is 5% lower than the driver power request.

7. The control system of claim 1, wherein the controller is configured to calculate the driver power request based on a determination that the ICE is on.

8. The control system of claim 1, wherein the upper offset is 10 kW higher than the driver power request.

9. The control system of claim 1, further comprising a generator that converts mechanical power from the ICE into electrical power to one of charge a high voltage battery and power at least one electric drive motor.

10. A method for controlling a speed of an internal combustion engine (ICE) in a series hybrid vehicle, the method comprising:
   receiving, at a controller, a torque request signal and a vehicle speed signal;
   calculating, based on the torque request and vehicle speed signals, a driver power request;
   calculating engine power limits including (i) a maximum engine power that includes the driver power request plus an upper offset; and (ii) a minimum engine power that includes the driver power request minus a lower offset;
   selecting a most efficient engine operating point between the maximum and minimum engine power; and
   controlling the ICE to operate at the most efficient engine operating point.

11. The method of claim 10, wherein the most efficient engine operating point comprises an engine speed and an engine torque.

12. The method of claim 10, wherein the upper offset is 20% higher than the driver power request.

13. The method of claim 10, wherein the upper offset is 15% higher than the driver power request.

14. The method of claim 10, wherein the upper offset is 10% higher than the driver power request.

15. The method of claim 10, wherein the lower offset is 5% lower than the driver power request.

16. The method of claim 10, further comprising:
   calculating the driver power request based on a determination that the ICE is on.

17. The method of claim 10, wherein the upper offset is 10 kW higher than the driver power request.

18. The method of claim 10, further comprising a generator that converts mechanical power from the ICE into electrical power to one of charge a high voltage battery and power at least one electric drive motor.

* * * * *